March 4, 1930.  R. H. THAYER  1,749,399
KEY TAG
Filed April 6, 1926
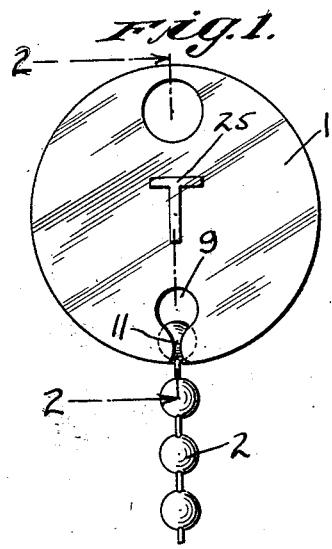
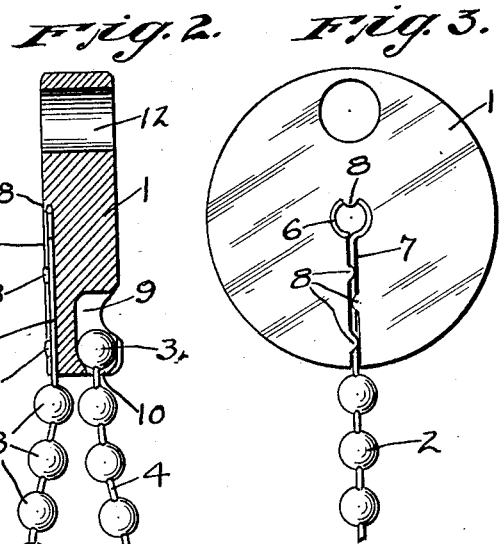
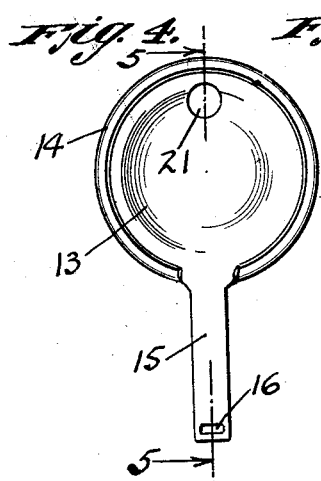
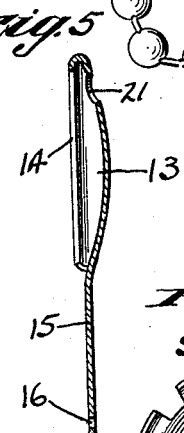
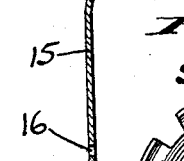
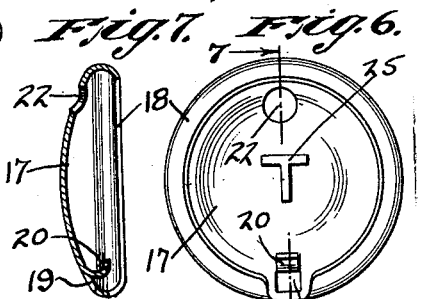
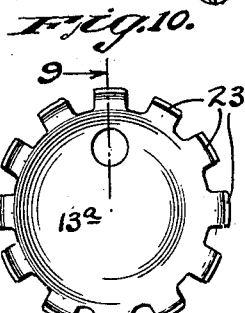
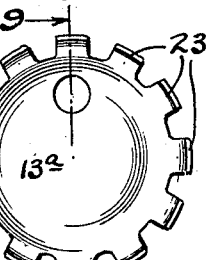
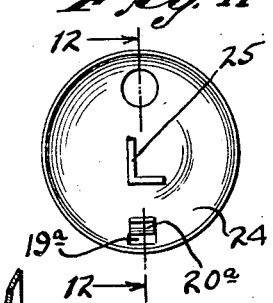
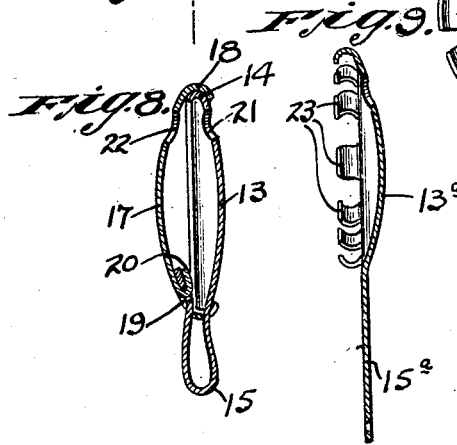
INVENTOR
REUEL H. THAYER
BY Hammond & Littell
ATTORNEYS Patented Mar. 4, 1930

1,749,399

UNITED STATES PATENT OFFICE

REUEL H. THAYER, OF NEW YORK, N. Y., ASSIGNOR TO THAYER TELKEE CORPORATION, OF SAN FRANCISCO, CALIFORNIA, A CORPORATION OF CALIFORNIA

KEY TAG

Application filed April 6, 1926. Serial No. 100,033.

This invention relates to identification tags for keys or the like adapted to be permanently but detachably secured to a key and to be normally associated and identified with said key during the life thereof.

One of the objects of the invention is to provide an identification tag which may be easily and simply constructed at low cost and in which a wide variety of interchangeable identification symbols may be used.

Another object of the invention is to provide an identification tag which may be easily attached to the key and removed therefrom, if desired.

Other objects and advantages of the invention will appear as the description proceeds.

Referring now to the drawings, in which several embodiments of my invention have been illustrated:

Figure 1 is a front view of one form of identification tag embodying my invention;

Figure 2 is a sectional elevation of this identification tag taken along line 2—2 of Figure 1;

Figure 3 is a rear view of the identification tag shown in Figure 1;

Figure 4 is a front view of one portion of a modified form of identification tag;

Figure 5 is a sectional view taken along line 5—5 of Figure 4;

Figure 6 is a front view of the face or identification portion of the identification tag;

Figure 7 is a sectional view taken along line 7—7 of Figure 6 of the face of the identification tag;

Figure 8 is a sectional elevation showing the two parts shown in Figures 4 and 6 secured together to form the identification tag;

Figure 9 is a sectional elevation of a modified form of the back of the identification tag shown in Figure 4, taken along line 9—9 of Figure 10;

Figure 10 is a rear view of this modified form of back;

Figure 11 is a front view of a modified face for the identification tag adapted to cooperate with the back shown in Figure 10; and Figure 12 is a sectional elevation of the face of the tag shown in Figure 11 and taken along line 12—12 of Figure 11.

Referring more specifically to the drawings, in Figures 1, 2 and 3 I have illustrated an identification tag comprising a disc 1 and a chain 2 attached to the disc. The chain 2 may comprise a plurality of balls 3 connected by link pins 4. An elongated link 5 may be attached to the end of the chain 2 and may be bent at the top to form an eyelet 6. A groove 7 is provided in the back of the disc 1 into which the link 5 may fit, the groove having an enlargement at its end to accommodate the eyelet 6 and the link 5 may be retained in the groove 7 by peening certain portions of the sides of the grooves, as 8 over against link 5. The other face of the disc 1, opposite the groove 7, may be provided with a recess 9 large enough to permit one of the balls 3 to pass therein and which communicates with an opening 10 in the edge of the disc 1. A narrow slot 11 in the disc 1 connects the recess 9 with the opening 10 and is wide enough to permit one of the links 4 to be forced therethrough when the end ball 3 is inserted in the recess 9 so that the chain 2 will be suspended thru the opening 10 in the edge of the disc. In order to attach this embodiment of the identification tag to a key, the chain 2 is passed through the hole in the key and the ball 3 at the end of the chain inserted in the recess 9, the pin link 4 being forced down through the slot 11 until it passes through the opening 10 in the edge of the disc and suspends the chain and key therefrom. A hole 12 may be provided near the opposite edge of the disc to attach the identification tag to a ring or hang the same upon a hook. The slot 11 is preferably of the same size as the diameter of the pin links 4 so as to offer a frictional resistance to the insertion or removal of the ball 3 into the hole 10 and retain the ball 3 against accidental displacement therefrom.

In Figures 4 to 8 I have shown a modification of the identification tag in which the two parts may be stamped or pressed out of thin sheet metal, the part of the larger size and more complicated construction carrying the key retaining loop and the part of the smaller size and cheaper construction carrying the identification symbols.

In Figures 4 and 5 the back of the tag is shown. This back comprises a dished button 13 having a resilient rim 14 around the edge thereof. A key retaining strip 15 is formed integral with the button 13 at one side thereof and has a slot 16 near its end.

In Figures 6 and 7 the cooperating face or identification portion of this modification of the identification tag is illustrated. The face preferably comprises a second annular dished button 17 having an annular rim 18 around the circumference thereof and an opening 19 near the edge thereof. A hook 20 is provided adjacent the opening 19. In this modification a key may be slipped over the strip 15 of the back 13 and the end of the strip 15 inserted in the opening 19 of the face 17 in such a manner that the hook 20 engages the opening 16 in the end of the strip 15. The back 13 and the face 17 are then brought toward each other bending the strip 15 as shown in Figure 8 and the back 13 may be forced inside of the rim 18 on the face 17. This action is similar to the method of attaching the two parts of an ordinary snap fastener and may be snapped in place with the fingers holding the parts firmly together. Holes 21 and 22 may be provided in the back and face of the tag, respectively, so that the tag may be attached to a ring or hang upon a hook, if desired. The loop 15 extending through the hole 19 and then connecting with the hook 20 effectively prevents accidental displacement of the end of the loop from the hook. If desired, however, the hook 20 may be bent upon the end of the loop as illustrated in Figure 8.

It will be understood that by providing a plurality of back portions 13 and a plurality of separate faces 17 with different symbols 25 thereon, the tags may be assembled with the desired identification symbol by selecting the proper face portion 17 and that a number and variety of identification symbols may be easily produced by merely changing the symbol on the face 17.

In Figures 9 and 10 a modified form of back of the identification tag, shown in Figure 8, is illustrated, and in this modification the back 13ª is provided with fingers 23 around the circumference thereof in place of rim 14, shown on the back 13. These fingers provide greater flexibility so that the back may be more easily snapped into the face part of the identification tag. Or, if desired, the back shown in Figures 9 and 10 may be used with the face 24 shown in Figures 11 and 12. This face comprises a dished disc similar to the face shown in Figure 6, but without the annular rim around the circumference thereof. An opening 19ª is provided to receive the end of the strip 15ª and a hook 20ª is adapted to engage the opening 16ª in the end of the strip 15ª. After the key has been placed on the strip 15ª, the face 24 may be attached to the strip 15ª in the manner already described and the strip 15ª bent over to insert the face 24 between the fingers 23 which may then be bent over to hold the same firmly in place. Any desired character 25 may be stamped or otherwise inscribed on the face of the identification tag to give the desired identification to any particular key.

It will be seen from the above that I have provided an identification tag which may be made at low cost and out of few parts, such parts being either stamped or pressed out of sheet metal and in which the identification portion is interchangeable with the backs. I have also provided a tag which may be attached to a key permanently without danger of the key becoming separated therefrom, but which may be removed from the key to be used again on another key without damaging the tag in any way.

Many changes and modifications of the embodiments shown and described may be resorted to without departing from the spirit of the invention and I do not therefore desire to limit myself to any of the embodiments shown, but to interpret the invention broadly within the scope of the appended claims.

What I claim as my invention is:

1. In an identification tag for a key, a face portion, a dished flange around the edge thereof, said face having an opening near the edge thereof, a back portion, a dished flange around the edge thereof adapted to fit inside of the flange on said face portion to hold said back and face portions together, and a key engaging link integral with said back portion, said link having an opening near the end thereof, a hook integral with said face portion and on the inner side thereof adjacent the opening therein, said link passing through the opening in said face, the opening therein engaging said hook.

2. In a key identification tag, a pair of discs having dished flanges around the edges thereof and adapted to snap together, the flange of one fitting inside the flange of the other, a key-engaging link integral with one disc and having an opening in the end thereof, a hook on the inner face of the other disc, said disc having an opening therethrough adjacent said hook, the end of said link passing through said opening and engaging said hook.

3. In a key identification tag, a face portion, a dished flange around the edge thereof, a back portion, a key engaging link integral with said back portion, a dished flange around the edge of said back portion adapted to snap inside the flange on said face portion and means to non-releasably secure the end of said link to said face portion, both said back portion and said front portion being correspondingly apertured to cooperate with a key ring or hook.

In testimony whereof I have affixed my signature to this specification.

REUEL H. THAYER.